C. R. YOUNG AND H. N. VAN DEUSEN.
TERMINAL BOX FOR ELECTRIC CABLES.
APPLICATION FILED JAN. 23, 1919.
1,422,910.
Patented July 18, 1922.
2 SHEETS—SHEET 1.
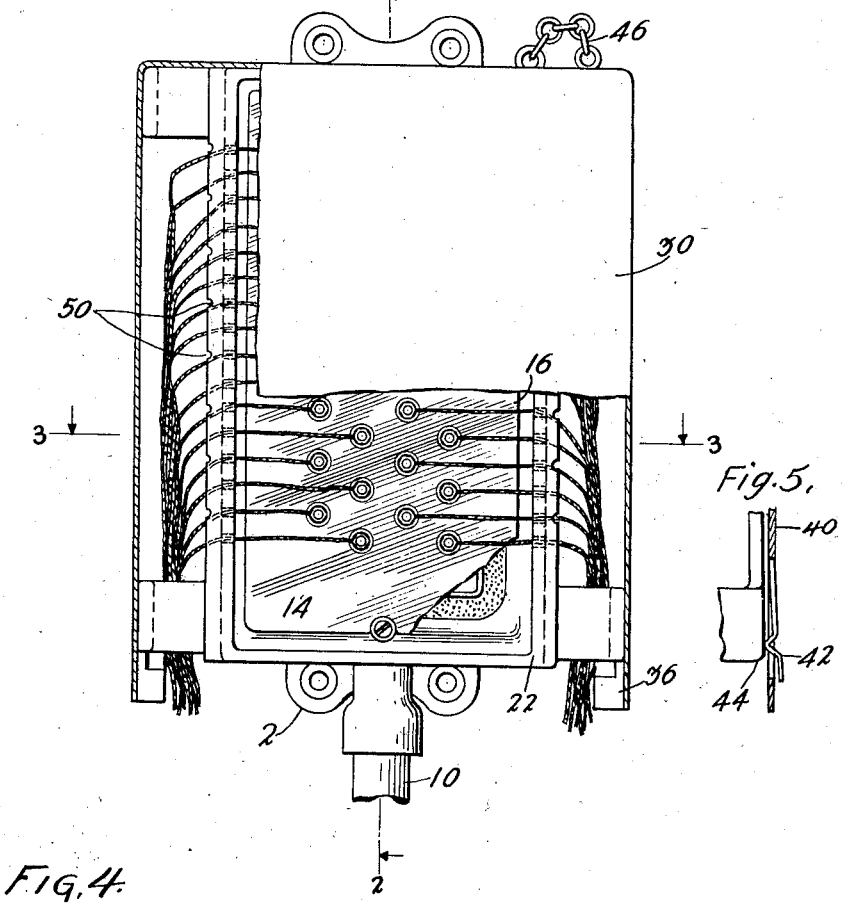
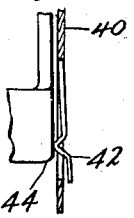
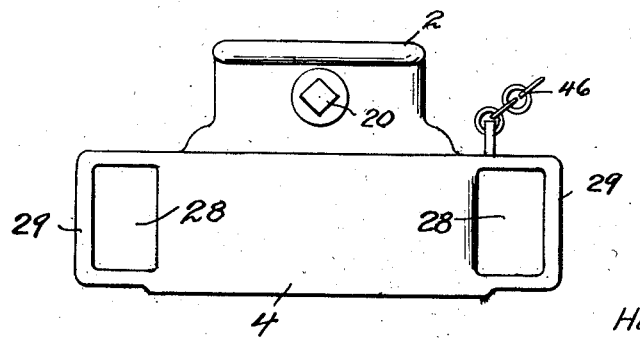
Inventors:
Charles R. Young
Harry N. Van Deusen
by *J. E. Roberts* Att'y.

C. R. YOUNG AND H. N. VAN DEUSEN.
TERMINAL BOX FOR ELECTRIC CABLES.
APPLICATION FILED JAN. 23, 1919.
1,422,910.
Patented July 18, 1922.
2 SHEETS—SHEET 2.
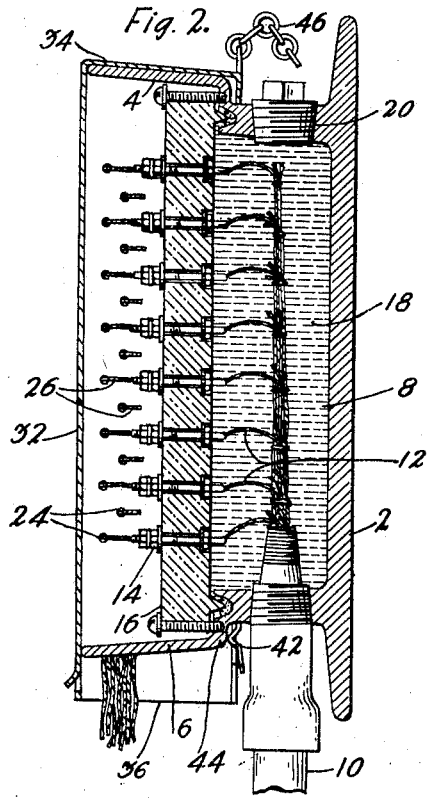
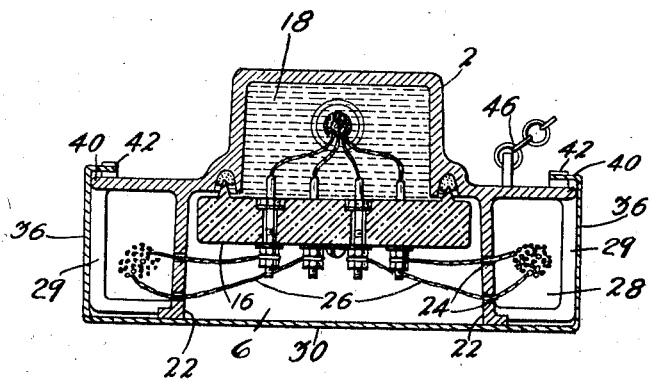
Inventor:
Charles R. Young
Harry N. Van Deusen
by  J. G. Roberts  Atty

UNITED STATES PATENT OFFICE.

CHARLES R. YOUNG, OF BLOOMFIELD, AND HARRY N. VAN DEUSEN, OF EAST ORANGE, NEW JERSEY, ASSIGNORS TO WESTERN ELECTRIC COMPANY, INCORPORATED, OF NEW YORK, N. Y., A CORPORATION OF NEW YORK.

TERMINAL BOX FOR ELECTRIC CABLES.

1,422,910. Specification of Letters Patent. Patented July 18, 1922.

Application filed January 23, 1919. Serial No. 272,610.

*To all whom it may concern:*

Be it known that we, CHARLES R. YOUNG and HARRY N. VAN DEUSEN, citizens of the United States, residing at Bloomfield, in the county of Essex, State of New Jersey, and East Orange, in the county of Essex, State of New Jersey, respectively, have invented certain new and useful Improvements in Terminal Boxes for Electric Cables, of which the following is a full, clear, concise, and exact description.

This invention relates to terminal-boxes for electric cables, and has particular reference to the terminal-boxes that are mounted on telephone poles or other supports carrying a telephone line cable to provide for the ready connection to the cable conductors of the conductors leading to subscribers' instruments.

A type of terminal-box largely used for this purpose is described in the patent to Grace and Snyder, No. 857,341, issued June 18, 1907, for terminal-boxes for electric cables. Such a terminal-box, as supplied to the lineman for installation, is provided with a short length of cable, known as a cable stub, entering through an opening in one end wall of the box, the inner end portion of the cable stub conductors being secured to terminal posts in the casing and mounted on an insulating support such as a block of porcelain or the like, the portions of the conductors within the casing being embedded in a suitable insulating compound; a cover hinged to the upper edge of the box and held closed by its own weight permits access to the interior thereof, while protecting the terminal posts from the weather. In installing the terminal-box, it is secured in place on the pole or other support, and the outer ends of the cable stub conductors are connected to the conductors of the main cable. As in some installations, the terminal-box is mounted below the cable and in other instances above the cable, it is necessary to carry in stock two types of boxes, i. e., one in which a cable stub enters through the top wall and another in which it enters through the bottom wall. When it is desired to connect a subscriber's installation to a pair of cable conductors, the local conductors or "drop wires" are connected to the terminal posts of the selected cable conductors and are led out through openings in the rear wall of the casing. A defect of this arrangement is that in exposed situations the "drop wire" openings permit the occasional entrance of dust, rain or snow, which may also force their way in beneath the cover if the latter does not rest tightly in place, collecting on the insulating block supporting the terminal posts and thereby impairing the insulation between these posts.

An object of the present invention is to provide an improved terminal-box, adapted to be mounted on its support with the cable stub wall forming either the upper or the lower end of the terminal-box as circumstances may render most advantageous. It is a further object of this invention to provide a cable terminal-box in which, although the terminal posts are readily accessible for the connection thereto of the "drop wires," the insulating block shall be substantially inaccessible to rain, snow and dust, so that the insulation between the terminal posts is not impaired.

A further object is to provide a terminal-box which shall be inexpensive to manufacture, durable and readily installed.

To these ends, the terminal-box of this invention is arranged with openings for the "drop wires" in each end wall, and is provided with a cover which may be slipped on from either end of the casing to close the front of the casing and the openings in one end wall, so that the terminal-box may be mounted on its support with either end wall uppermost and the "drop wires" passing through the opposite lower end wall, the openings of which are not readily reached by rain, and the like. A pair of partitions extend between the end walls for cooperating with said walls and the cover to provide a substantially weather-tight compartment for the insulating block supporting the terminal posts; these partitions are provided with openings for the passage of the "drop wires." The partitions may be cast integral with the casing, and in order to facilitate the drilling of the holes, the side walls of the terminal-box are removable, being formed as part of the cover.

Further objects and advantages of the invention will be apparent from the following detailed description, taken in connection with the accompanying drawings, in which Fig. 1 is a front elevation of the terminal-box embodying this invention, with portions broken away; Fig. 2 is a vertical cross-section taken approximately on line 2—2 of Fig. 1; Fig. 3 is a horizontal cross-section taken on line 3—3 of Fig. 1; Fig. 4 is a top plan view of the box with the cover removed; and Fig. 5 shows a detail of the cover.

In the preferred form of this invention, the terminal-box. as in the box described in the above-referred to Grace and Snyder patent, comprises a vertical rear wall or base 2, and end walls 4 and 6, arranged to provide a recess or rear compartment 8. The cable stub 10 is brought into compartment 8 through one of said end walls; the ends of the cable conductors 12 are connected to the ends of terminal posts 14, carried in a mounting block 16, which forms the front wall of compartment 8; compartment 8 is filled with suitable compound 18, poured in through the opening 20 in one of the end walls, after the conductors 12 have been connected to the terminal posts.

According to the present invention, two partitions 22 extend from one of the end walls to the other, adjacent to the side edges of the mounting block 16. These partitions extend forwardly from the rear wall practically the same distance as the end walls, so that the front edges of the partition and walls are in substantially the same vertical plane.

The partitions 22 are provided with openings 24 for the passage of the drop wires 26 and thus form fanning strips by which the drop wires are kept from becoming entangled and confused. Those openings, which are not occupied by wires, are preferably closed by plugs.

The rear and end walls and the partitions are preferably cast in a single integral body, therefore, in order to facilitate the drilling of the drop-wire holes 24 in the partitions, the sides of the body of the casing are left open; this construction also makes it somewhat easier to thread the drop-wires through the openings.

The end portions 29 of the end walls 4 and 6 beyond the partition 22 are provided with wide openings 28 for the passage of the two groups of drop wires. The end portions 29 have a greater vertical thickness than the end walls 4 and 6, as is shown in Fig. 1, in order to obtain additional strength to prevent breakage under strains incidental to the handling of the casing.

The casing is provided with a cover member 30, preferably of sheet metal, comprising a front portion 32, adapted to rest in juxtaposition to the front edges of the end walls 4 and 6 and of the partitions 22, and thus form front walls for the central and lateral compartments of the terminal-box. The cover member is provided at its top edge with a rearward extension 34. arranged to rest upon the upper end wall of the casing and to suspend the cover therefrom. The extension 34 also serves to cover the openings 28 in the upper end wall and thus entrance of rain, snow and dust therethrough is prevented.

The cover member is also provided at the sides with rearward extensions or wings 36 which form side walls for the casing. On the rear edges of the extensions are formed flanges 40, near the lower end of each of which is a spring finger 42, arranged to bear upon the rear wall of the casing at 44. By the spring action of these fingers, the cover is drawn closely against the front edges of the casing and a tight closure is therefore assured; the fingers also serve to hold the cover in adjusted position when partially withdrawn to permit access to the terminal posts.

It will be seen that by the above arrangement the terminal-box is divided transversely to provide a central compartment for the terminal posts 14 which is substantially inaccessible to rain, snow or dust, and also to provide two lateral compartments into which the drop conductors are led through the fanning strips before passing out of the terminal-box.

In the drawings, the casing is shown with the cable stub entering from below, but by reason of the arrangement of the cover and the provision of openings in both of the end walls 4 and 6, it is apparent that the casing may be reversed to bring the cable stub at the top. Under these circumstances, the groups of drop wires would pass out through the openings in the end wall 4, while the cover would be suspended from the end wall 6. which would then be the upper end wall.

The cover is secured to the casing by a chain 46, connected to the top extension 34 of the cover and to a middle portion of the rear wall of the casing. By this means the cover when moved from the casing is conveniently prevented from loss without interfering with its being slid onto the casing from either end.

The front edges of the partition 22 are adapted to be provided with numbers, or the like, identifying the drop wires passing through the respective openings adjacent thereto; in order to separate these characters into convenient groups, as for instance, in accordance with the pairing of the drop wires, notches 50 are spaced along the edge of the partitions.

What is claimed is:

1. A cable terminal-box comprising a rear wall, two opposite end walls extending forwardly from said rear wall, a cover for the box forming a detachable front wall therefor and having rearwardly extending wings arranged to form the side walls of the box, and a pair of partitions connecting said end walls and extending forwardly from said rear wall substantially to the plane of the front edges of said end walls, whereby the box is divided transversely into a central compartment having a removable front wall and two lateral compartments each having a removable front wall and a removable side wall.

2. A cable terminal-box comprising a rear wall, two opposite end walls extending forwardly from said rear wall, a cover for the box forming a detachable front wall therefor, and having rearwardly extending wings arranged to form the side walls of the box, and a pair of partitions connecting said end walls and extending forwardly from said rear wall substantially to the plane of the front edges of said end walls, whereby the box is divided transversely into a central compartment having a removable front wall, and two lateral compartments each having a removable front wall and a removable side wall, one of said end walls having an opening for the passage of a cable, the bottom end wall having between each partition and its outer edge an opening for the passage of groups of conductors and said partitions having openings for the passage of individual conductors.

3. A cable terminal-box comprising a substantially vertical rear wall, top and bottom walls extending forwardly therefrom, a pair of vertical partitions extending forwardly from said rear wall substantially to the plane of the front edges of the top and bottom walls to form a central compartment in said terminal-box, each of said partitions being provided with a plurality of openings for the passage of individual conductors, and a removable cover comprising a front portion and rearwardly extending side wings adapted to form the side walls of the terminal-box.

4. A reversible cable terminal-box comprising a rear wall, opposite end walls extending forwardly therefrom to form the top and bottom of the box, each of said end walls having openings adapted for the passage of groups of conductors, and a cover member having a rearwardly extending portion at its upper end adapted to overlie the upper end wall to cover the openings therein and to support the cover in place.

5. A reversible cable terminal-box comprising a rear wall, opposite end walls extending forwardly therefrom to form the top and bottom of the box, each of said end walls having openings adapted for the passage of groups of conductors, a cover member having a rearwardly extending portion at its upper end adapted to overlie the upper end wall to cover the openings therein and to support the cover in place, and side walls for the casing carried by said cover member.

6. A reversible cable terminal-box comprising a rear wall, opposite end walls extending forwardly therefrom to form the top and bottom of the box, each of said end walls having openings adapted for the passage of groups of conductors, a cover member having a rearwardly extending portion at its upper end adapted to overlie the upper end wall to cover the openings therein and to support the cover in place, side walls for the box carried by said cover member, and partitions connecting said end walls, said partitions and end walls having their forward edges in substantially the same plane.

7. A reversible cable terminal-box comprising a rear wall, opposite end walls extending forwardly therefrom to form the top and bottom of the box, each of said end walls having openings adapted for the passage of groups of conductors, a cover member having a rearwardly extending portion at its upper end adapted to overlie the upper end wall to cover the openings therein and to support the cover in place, side walls for the box carried by said cover member, and means on the rear edges of said side walls adapted to cooperate with said rear wall to hold said cover member in place.

8. A reversible cable terminal-box comprising a rear wall, end walls extending forwardly therefrom, partitions connecting said end walls and extending forwardly from said rear wall substantially to the plane of the front edges of said end walls, and a cover member having rearward extensions at its upper and side edges, the side extensions forming side walls for the box when the cover is in place and the top extension adapted to overlie the top end wall of the box to suspend the cover therefrom.

9. A reversible cable terminal-box comprising a rear wall, end walls extending forwardly therefrom, partitions connecting said end walls and extending forwardly from said rear wall substantially to the plane of the front edges of said end the same distance as said end walls, and a cover member having rearward extensions at its upper and side edges, the said extensions forming side walls for the box when the cover is in place and the top extension adapted to overlie the top end wall of the box to suspend the cover therefrom, means on the rear edges of the side extensions to hold the cover in place.

10. In a cable terminal-box, a body portion comprising a base, end walls carried by said base, partitions connecting said end walls and extending from said base substantially the same distance as said end walls, and a cover member slidable onto said body portion from either end and having side wings adapted to form the side walls of said terminal-box.

11. In a cable terminal-box, a body portion comprising a base, end walls carried by said base each of said end walls having an opening adapted to receive a length of cable therethrough, partitions connecting said end walls and extending from said base substantially the same distance as said end walls, and a cover member slidable onto said body portion from either end and having side wings adapted to form the side walls of said terminal-box.

12. In a cable terminal-box, a body portion comprising a base, end walls carried by said base, each of said end walls having an opening adapted to receive a length of cable therethrough, partitions connecting said end walls and extending from said base substantially the same distance as said end walls, terminal posts between said partitions, and a cover member slidable onto said body portion from either end and having side wings adapted to form the side walls of said terminal-box.

13. A cable terminal-box comprising a central inclosure consisting of a rear wall, forwardly extending end walls and forwardly extending side walls; lateral extensions of the said rear wall; and an enveloping cover consisting of a front wall, rearwardly extending side walls and a rearwardly extending end wall, said cover co-operating with the said lateral extensions of the rear wall and said central inclosure to form two lateral compartments and to enclose the central inclosure.

14. A cable terminal box comprising a central inclosure consisting of a rear wall, forwardly extending end walls and forwardly extending side walls provided with a plurality of holes to receive conducting wires; extensions of said rear wall extending laterally beyond said forwardy extending side walls; and an enveloping cover consisting of a front wall, rearwardly extending side walls and a rearwardly extending end wall, and means provided at the edges of said side and end walls of the cover co operating with said rear wall to hold said cover in place.

15. A cable terminal-box comprising a central inclosure consisting of a rear wall, forwardly extending end walls and forwardly extending side walls; extensions of the said rear wall extending a considerable distance beyond said side walls; extensions of said end walls extending beyond said side walls substantially to the lateral edges of said rear wall, each of said extensions of the end walls being provided with an aperture to allow the admission of groups of conductor wires; and enveloping cover consisting of a front wall, rearwardly extending side walls, a rearwardly extending end wall, and an inwardly projecting lip provided on the edges of each of said side and end walls of the cover co-operating with the said rear wall to hold said cover in place.

In witness whereof, we hereunto subscribe our names this 16th day of January, A. D. 1919.

CHARLES R. YOUNG.
HARRY N. VAN DEUSEN.